US010161435B2

(12) United States Patent
Lewis et al.

(10) Patent No.: US 10,161,435 B2
(45) Date of Patent: Dec. 25, 2018

(54) SELF-ATTACHING FASTENER AND PANEL ASSEMBLY, AND METHOD OF ATTACHING

(71) Applicant: Whitesell Formed Components, Inc., Waterford, MI (US)

(72) Inventors: Jeffrey C. Lewis, Addison Township, MI (US); Srecko Zdravkovic, Sterling Heights, MI (US)

( * ) Notice: Subject to any disclaimer, the term of this patent is extended or adjusted under 35 U.S.C. 154(b) by 401 days.

(21) Appl. No.: 15/043,980

(22) Filed: Feb. 15, 2016

(65) Prior Publication Data
US 2017/0234353 A1 Aug. 17, 2017

(51) Int. Cl.
F16B 37/04 (2006.01)
F16B 37/06 (2006.01)
B23P 19/06 (2006.01)

(52) U.S. Cl.
CPC .......... F16B 37/065 (2013.01); B23P 19/063 (2013.01)

(58) Field of Classification Search
CPC .............................. F16B 37/065; F16B 37/068
USPC .......................................... 411/180, 181, 183
See application file for complete search history.

(56) References Cited

U.S. PATENT DOCUMENTS

| 47,245 | A | | 4/1865 | Pond | |
|---|---|---|---|---|---|
| 1,759,339 | A | * | 5/1930 | Andren | F16B 37/065 411/180 |
| 1,822,657 | A | | 9/1931 | Horton | |
| 2,138,409 | A | * | 11/1938 | Salter | F16B 37/065 411/183 |
| 2,174,549 | A | * | 10/1939 | Biaho | B60K 17/04 285/202 |
| 3,283,794 | A | * | 11/1966 | Steward | F16B 37/065 29/509 |
| 3,337,946 | A | * | 8/1967 | Anderson | F16B 37/068 29/432.1 |
| 3,602,974 | A | | 9/1971 | Koett | |

(Continued)

FOREIGN PATENT DOCUMENTS

EP 0539793 5/1993

OTHER PUBLICATIONS

Wu, Xin, et al., "Characterization of Mechanically Sheared Edges of Dual Phase Steels", Dept. of Mech. Eng., Wayne State University, 41 pages.

Primary Examiner — Gary W Estremsky
(74) Attorney, Agent, or Firm — Ryder, Lu, Mazzeo & Konieczny LLC; Joseph M. Konieczny Sr.; Gregory J. Gore

(57) ABSTRACT

A self-attaching fastener includes a substantially polyhedral head portion defining a longitudinal axis. The head portion is circumscribable by a first cylinder having a head diameter. The first cylinder is coaxial to the longitudinal axis. A central pilot portion substantially defines a pilot polyhedron extending from the head portion along the longitudinal axis. The central pilot portion is circumscribable by a second cylinder having a pilot diameter smaller than the head diameter. The second cylinder is coaxial to the longitudinal axis. The central pilot portion has a perimetric wall with rectangular faces of the pilot polyhedron. The rectangular faces are defined in respective planes that are parallel to the longitudinal axis. A planar panel support surface is defined on the head portion. The planar panel support surface defines a closed substantially polygonal planar margin at a perimeter of the planar panel support surface.

25 Claims, 10 Drawing Sheets

(56) References Cited

U.S. PATENT DOCUMENTS

| | | | |
|---|---|---|---|
| 3,736,969 A * | 6/1973 | Warn | F16B 37/068 |
| | | | 411/179 |
| 5,335,411 A | 8/1994 | Muller et al. | |
| 5,423,645 A * | 6/1995 | Muller | B23P 19/062 |
| | | | 411/113 |
| 6,220,804 B1 * | 4/2001 | Pamer | F16B 37/068 |
| | | | 29/432.2 |
| D448,660 S | 10/2001 | Pamer et al. | |
| 6,409,444 B2 | 6/2002 | Pamer et al. | |
| 6,789,309 B2 | 9/2004 | Kondo | |
| 7,179,034 B2 | 2/2007 | Ladouceur | |
| 7,425,111 B2 | 9/2008 | Ladouceur | |
| 7,480,971 B2 * | 1/2009 | Oliver | B23P 19/062 |
| | | | 29/33.5 |
| 7,681,298 B2 | 3/2010 | Babej | |
| 8,230,571 B2 | 7/2012 | Kovac | |
| 8,458,881 B1 | 6/2013 | Danyo et al. | |
| 8,601,669 B2 | 12/2013 | Babej | |
| 8,899,089 B1 * | 12/2014 | Shinjo | B21D 53/24 |
| | | | 470/87 |
| 8,939,689 B2 * | 1/2015 | Babej | F16B 19/00 |
| | | | 411/180 |
| 9,249,823 B2 * | 2/2016 | Babej | F16B 37/068 |
| 2011/0211932 A1 | 9/2011 | Babej et al. | |
| 2012/0028070 A1 | 2/2012 | Babej et al. | |
| 2016/0298204 A1 * | 10/2016 | Thomas | C21D 1/18 |

* cited by examiner

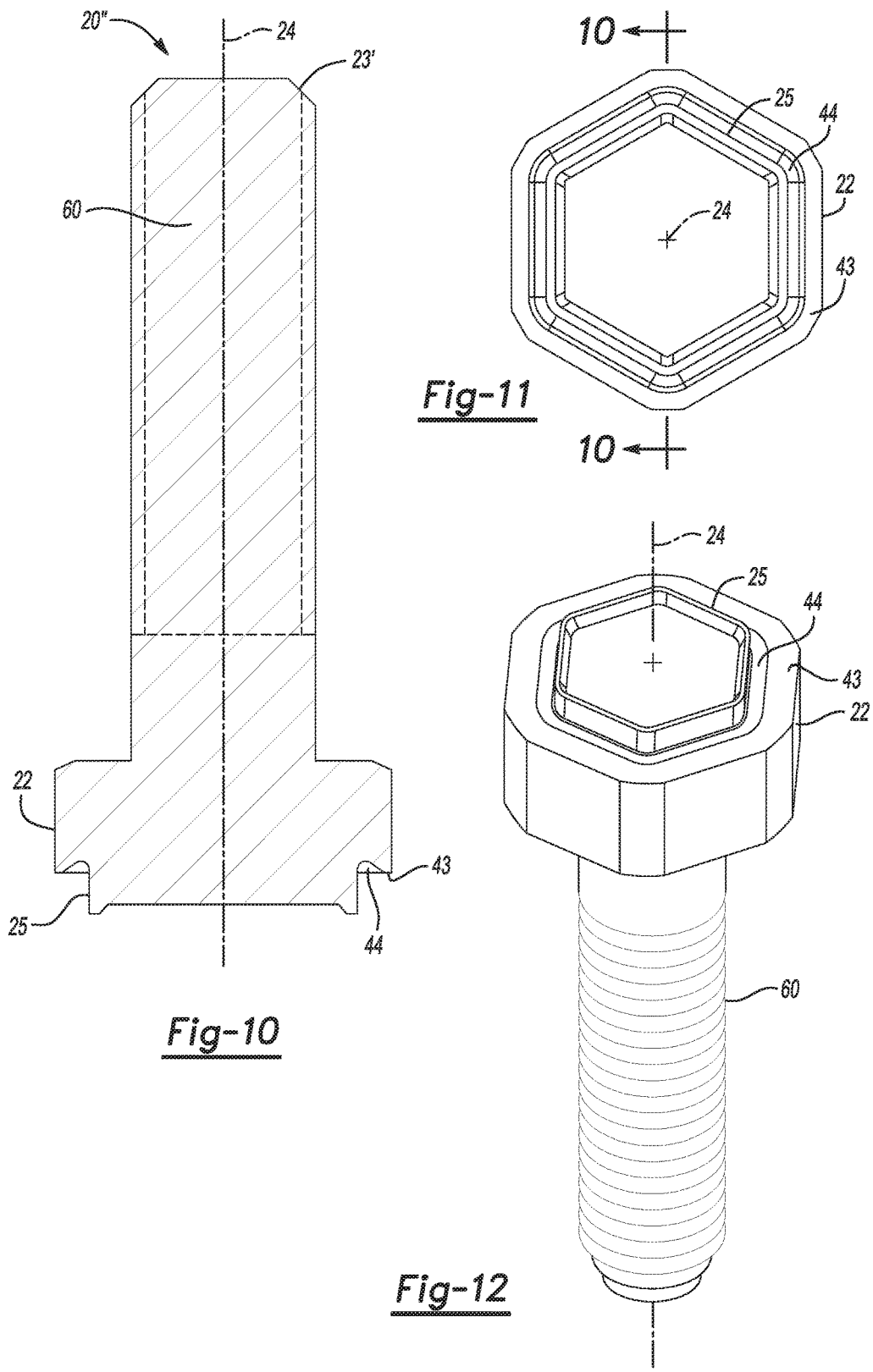

SELF-ATTACHING FASTENER AND PANEL ASSEMBLY, AND METHOD OF ATTACHING

BACKGROUND

Some self-attaching fasteners are attachable to panels without welding. As used herein, the term self-attaching fastener includes male and female self-piercing and self-clinching fasteners which are permanently attached to a panel. Examples of self-attaching fasteners include pierce and clinch studs, bolts and the like; and pierce and clinch nuts and other female fasteners of this type. Self-attaching fasteners include a fastener portion, such as a threaded or unthreaded shank portion in the case of male fasteners, or a threaded or unthreaded bore in the case of female fasteners.

The term "self-piercing fastener" as used herein refers to a self-attaching fastener in which the barrel portion is to pierce an opening in the panel. The term "self-clinching fastener" as used herein refers to a self-attaching fastener that is permanently installable in an opening that is preformed in the panel prior to inserting the self-clinching fastener into the preformed opening.

SUMMARY

An example of a self-attaching fastener includes a substantially polyhedral head portion defining a longitudinal axis. The head portion is circumscribable by a first cylinder having a head diameter. The first cylinder is coaxial to the longitudinal axis. A central pilot portion substantially defines a pilot polyhedron extending from the head portion along the longitudinal axis. The central pilot portion is circumscribable by a second cylinder having a pilot diameter smaller than the head diameter. The second cylinder is coaxial to the longitudinal axis. The central pilot portion has a perimetric wall with rectangular faces of the pilot polyhedron. The rectangular faces are defined in respective planes that are parallel to the longitudinal axis. A planar panel support surface is defined on the head portion. The planar panel support surface defines a closed substantially polygonal planar margin at a perimeter of the planar panel support surface.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 10 is a semi-schematic cross-sectional side view, taken along line 10-10 of FIG. 11, of an example of the self-attaching fastener of the present disclosure with a threaded shaft extending from the head portion;

FIG. 11 is a semi-schematic end view of the example of the self-attaching fastener depicted in FIG. 10;

FIG. 12 is a semi-schematic perspective view of the example of the self-attaching fastener depicted in FIG. 10;

DETAILED DESCRIPTION

Figure 5:
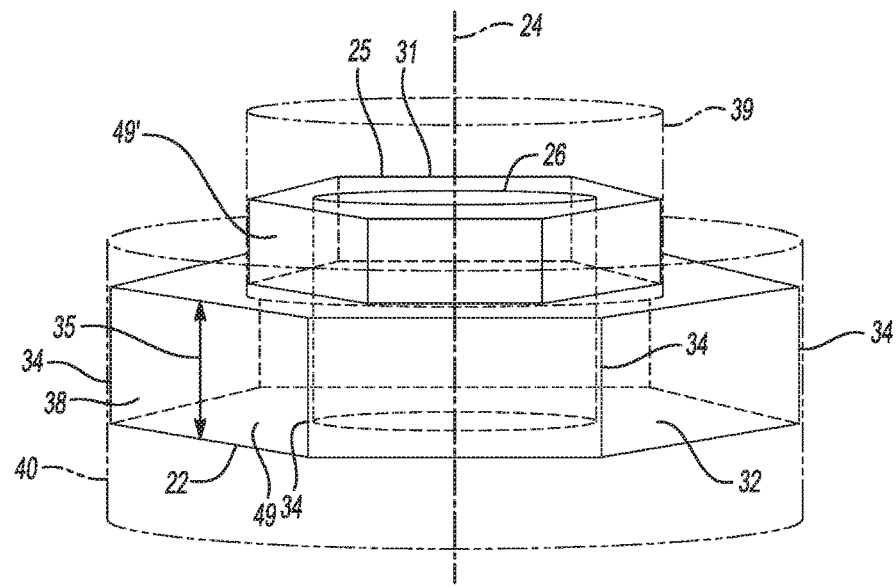
FIG. 5 is a schematic perspective view of an example of the self-attaching fastener of the present disclosure.
Figure 6:
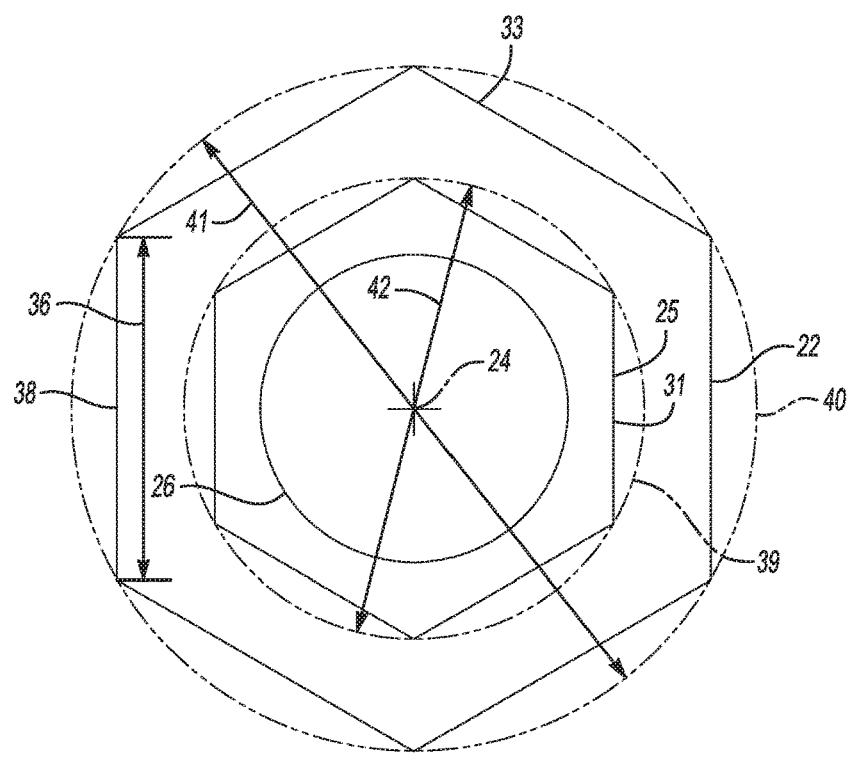
FIG. 6 is a schematic end view of the example of the self-attaching fastener depicted in FIG. 5.

FIGS. 1-4 depict an example of a self-attaching fastener 20 according to the present disclosure. The self-attaching fastener 20 has a substantially polyhedral head portion 22 defining a longitudinal axis 24. In examples of the present disclosure, the head portion 22 is circumscribable by a first cylinder 40 having a head diameter 41. As depicted in FIGS. 5 and 6, the first cylinder 40 is coaxial to the longitudinal axis 24. A central pilot portion 25 substantially defines a pilot polyhedron 31 extending from the head portion 22 along the longitudinal axis 24. The central pilot portion 25 is circumscribable by a second cylinder 39 having a pilot diameter 42 smaller than the head diameter 41. The second cylinder 39 is coaxial to the longitudinal axis 24. A planar panel support surface 43 is defined on the head portion 22. The planar panel support surface 43 defines a closed substantially polygonal planar margin 30 at a perimeter 37 of the planar panel support surface 43.

As used herein, "circumscribable by a cylinder" means that a right circular cylinder may be constructed such that the entire circumscribable shape fits within the cylinder. A minimum bounding cylinder is the smallest cylinder that completely contains the shape inside the cylinder. The circumscribed cylinder may be a minimum bounding cylinder.

As used herein, "polyhedral" means having the shape of a polyhedron. As used herein, a "polyhedron" is a threedimensional solid geometric figure whose sides are polygons. A regular polyhedron is a polyhedron whose faces are all congruent regular polygons. As used herein, a "regular polygon" is a polygon for which all sides are congruent and all angles are congruent. FIG. 5 depicts a hexagonal prism 32, which is a prism with hexagonal base 33.

As used herein, a "prism" is a polyhedron with an n-sided polygonal base, another congruent parallel base (with the same rotational orientation), and n other faces (necessarily all parallelograms) joining corresponding sides of the two bases. All cross-sections parallel to the base faces are congruent to the bases. Prisms are named for their base, so a prism with a hexagonal base is called a hexagonal prism. A right prism is a prism in which the joining edges and faces are perpendicular to the base faces. This applies if the joining faces are rectangular. As used herein, a "regular prism" is a prism with bases that are regular polygons.

The example of the hexagonal prism 32 depicted in FIG. 5 is a polyhedron with 8 faces, 18 edges, and 12 vertices. The example of the hexagonal prism 32 depicted in FIG. 5 is a right regular hexagonal prism. Since the hexagonal prism 32 has eight faces, the hexagonal prism is an octahedron. However, the term octahedron is primarily used to refer to the regular octahedron, which has eight triangular faces. The head portion 22 is "substantially" polyhedral because the longitudinal edges 34 of the prism may be truncated, or cut-off as explained below, and the outer contours may vary from the perfect polyhedron within manufacturing tolerances and to accommodate draft angles. Further, a bore 26 may be defined through the polyhedron.

To be specific, the truncated edges 34 of the prism may be limited by example as follows: The hexagonal prism 32 has 6 rectangular sides 38 and 2 hexagonal bases. The rectangular sides 38 have a height 35 and a width 36. The longitudinal edges 34 of the hexagonal prism 32 may be truncated, or cut-off, such that the width 36' of the truncated rectangular sides 28 are greater than about 90 percent of the width 36 of the rectangular sides 38 of the hexagonal prism 32. The adjacent edges of the the truncated rectangular sides 28 may be joined by a chamfer 29 or a fillet 27. It is to be understood that the polyhedron may have any number of sides greater than 2. For example, the polyhedron may be a triangular prism, a rectangular prism, a pentagonal prism, etc.

In examples of the present disclosure, the substantially polyhedral head portion 22 may be substantially a regular hexagonal prism, and the pilot polyhedron 31 may be substantially another regular hexagonal prism. As depicted in FIGS. 5 and 6, each rectangular face 49 of the regular hexagonal prism may be parallel to a corresponding rectangular face 49' of the other regular hexagonal prism. Parallel alignment of the faces of the head portion 22 and the central pilot portion 25 may facilitate rotational alignment of the central pilot portion 25 with features in the panel 50 during insertion of the self-attaching fastener 20.

Figure 15:
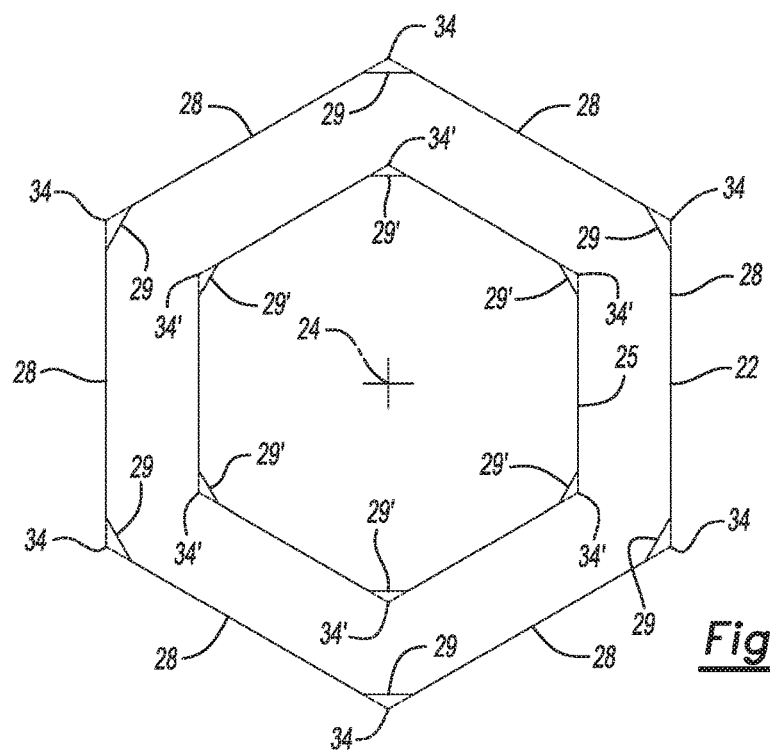
FIG. 15 is a schematic end view of an example of a self-attaching fastener with chamfers joining adjacent truncated sides according to the present disclosure.
Figure 16:
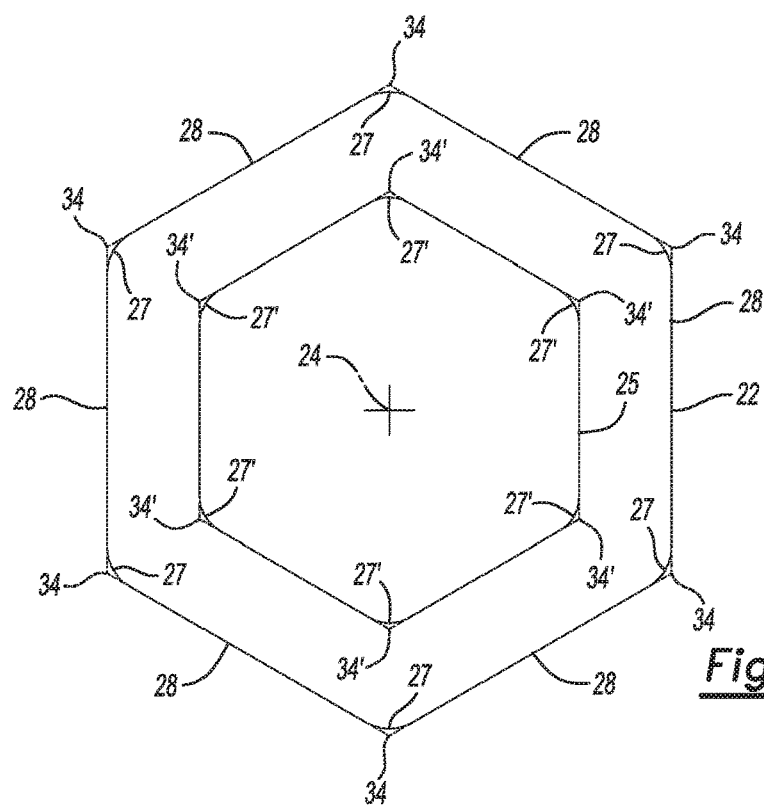
FIG. 16 is a schematic end view of an example of a self-attaching fastener with fillets joining adjacent truncated sides according to the present disclosure.

FIG. 15 is a schematic end view of an example of a self-attaching fastener 20 with chamfers joining adjacent truncated sides 28 according to the present disclosure. FIG. 16 is a schematic end view of an example of a self-attaching fastener 20 with fillets joining adjacent truncated sides 28 according to the present disclosure. Some of the details of the self-attaching fastener 20 have not been shown in FIG. 15 and FIG. 16 to more clearly depict the elements related to chamfers and fillets on the edges of a hexagonal example of the self-attaching fastener. In examples of the present disclosure, the substantially polyhedral head portion 22 may be substantially a regular hexagonal prism chamfered 29 at the longitudinal edges 34 of the regular hexagonal prism, and the pilot polyhedron is substantially another regular hexagonal prism chamfered 29' at the longitudinal edges 34' of the other regular hexagonal prism as depicted in FIG. 15. It is to be understood that the chamfers may have fillets at the corners. In other words, the corners are not necessarily sharp. The substantially polyhedral head portion 22 may be substantially a regular hexagonal prism with fillets 27 at the longitudinal edges 34 of the regular hexagonal prism, and the pilot polyhedron may be substantially another regular hexagonal prism with fillets 27' at the longitudinal edges 34' of the other regular hexagonal prism as depicted in FIG. 16.

A groove 44 may be defined parallel and adjacent to the panel support surface 43 in the head portion 22. The groove 44 defines a closed substantially polygonal trough 45 between the panel support surface 43 and the central pilot portion 25. The closed polygon refers to the shape of the groove 44 defined in the plane of the panel support surface; not a cross-section of the groove 44. The groove 44 may run parallel to the outer contours 46 of the head portion 22. The groove 44 is to provide clearance for a burr 47 established on the panel 50 in contact with the planar panel support surface 43.

In examples of the self-attaching fastener 20 of the present disclosure, the central pilot portion 25 has a perimetric wall 48. As used herein, "perimetric" means relating to an outer boundary. Thus, the perimetric wall 48 is the outer boundary of the central pilot portion 25. The perimetric wall 48 has rectangular faces 49' of the pilot polyhedron 31. The rectangular faces 49' are defined in respective planes 51 that are parallel to the longitudinal axis 24. A rim 52 is defined at a leading end 53 of the perimetric wall 48.

The rectangular faces 49 of the perimetric wall 48 continue into the groove 44. That is, the rectangular faces 49 of the perimetric wall 48 cross the plane of the panel support surface 43. With respect to FIG. 3, the term "above" means toward the leading end 53 of the perimetric wall 48; and the term "below" means toward the opposite of "above". Thus, the perimetric wall 48 has straight sides that extend below the plane of the panel support surface 43 into the groove 44. An outer wall 76 of the groove 44 is sloped at an angle of about 45 degrees from the plane of the panel support surface 43. A floor 77 of the groove 44 is defined by a floor fillet 78 having a radius of about 0.4 mm. The floor fillet 78 is tangent to the outer wall 76 and to the perimetric wall 48. The intersection 79 of the floor fillet 78 and the perimetric wall 48 is below the plane of the panel support surface 43. In an example, the intersection 79 of the floor fillet 78 and the perimetric wall 48 is below the plane of the panel support surface 43 by at least about 0.1 mm.

The rim 52 has a planar end face 54 at a leading end 53' of the rim 52 corresponding to the leading end 53 of the perimetric wall 48. The rim 52 has an inner wall 55 opposite to the perimetric wall 48. The inner wall 55 defines an interior chamfer 56 such that a leading end 53' of the rim 52 is narrower than a base 57 of the rim 52 at an interface of the rim 52 with a body 58 of the central pilot portion 25. The body 58 of the central pilot portion 25 is at least twice as thick as the end face 54 of the rim 52 measured along respective lines 59 orthogonal to the longitudinal axis 24.

In the example of the self-attaching fastener depicted in FIGS. 1-4, the self-attaching fastener 20 is a nut 21 having a threaded bore 26 defined along the longitudinal axis 24 continuously through the central pilot portion 25 and the head portion 22.

Figure 7:
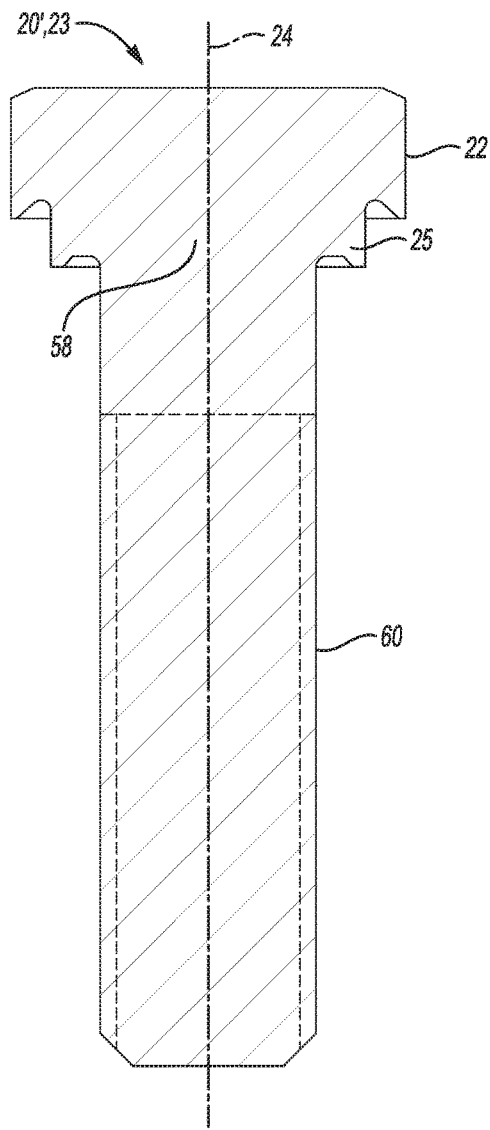
FIG. 7 is a semi-schematic cross-sectional side view of an example of the self-attaching fastener of the present disclosure with a threaded shaft extending from the body of the central pilot portion.
Figure 8:
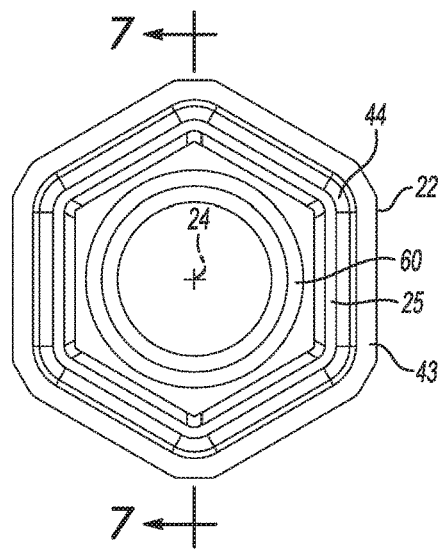
FIG. 8 is a semi-schematic end view of the example of the self-attaching fastener depicted in FIG. 7.
Figure 9:
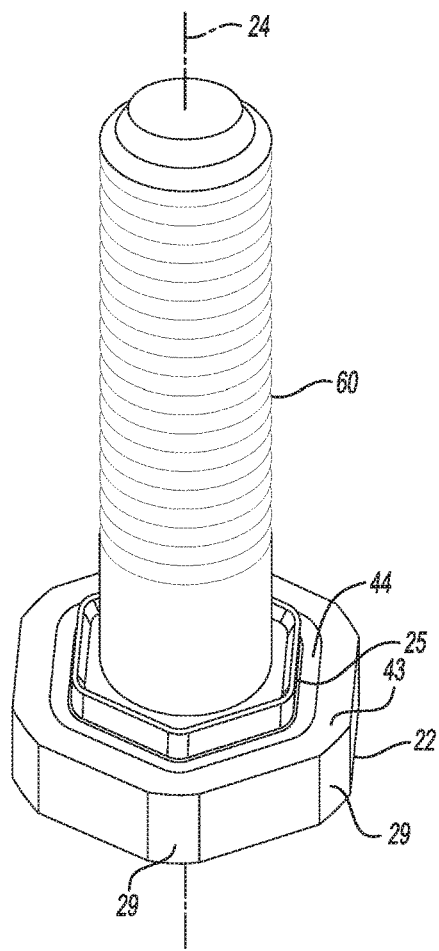
FIG. 9 is a semi-schematic perspective view of the example of the self-attaching fastener depicted in FIG. 7.

In the example of the self-attaching fastener depicted in FIGS. 7-9, the self-attaching fastener 20' is a stud 23 having a threaded shaft 60 defined along the longitudinal axis 24 extending from the body 58 of the central pilot portion 25.

In the example of the self-attaching fastener depicted in FIGS. 10-12, the self-attaching fastener 20" is a stud 23' having a threaded shaft 60 defined along the longitudinal axis 24 extending from the head portion 22. In another example (not shown), the self-attaching fastener may be a double ended stud having a first threaded shaft extending from the body of the central pilot portion and a second threaded shaft extending from the head portion in a direction opposite to the first threaded shaft.

Figure 13:
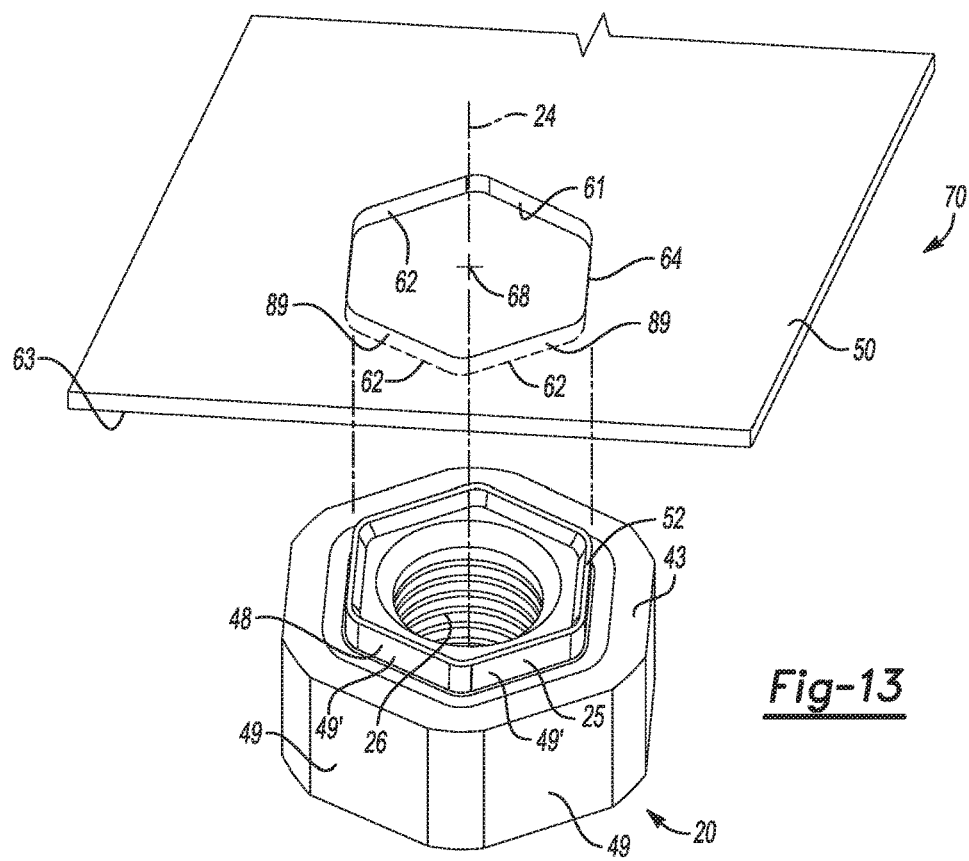
FIG. 13 is a semi-schematic exploded view of an example of an assembly of a panel and self-attaching fastener.
Figure 14:
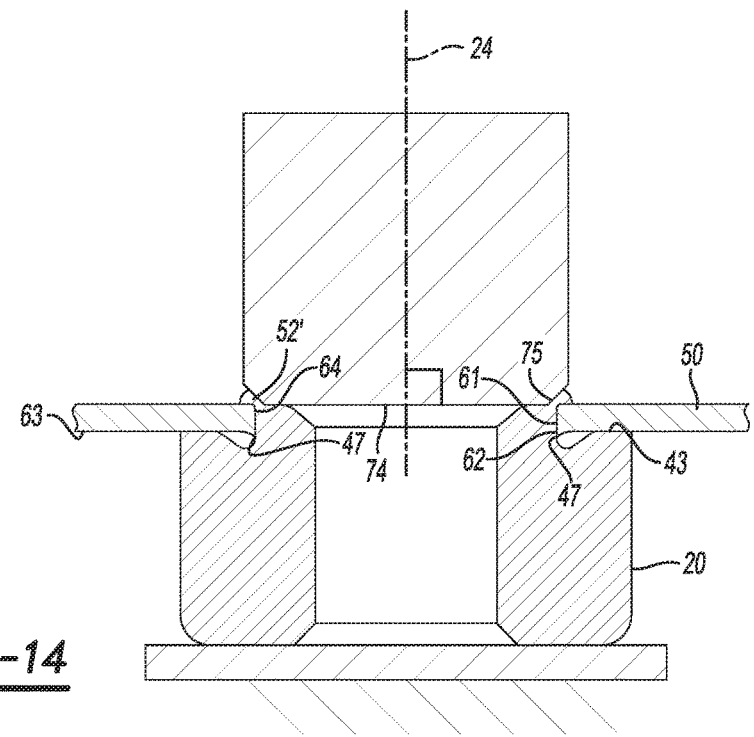
FIG. 14 is a semi-schematic cross sectional side view of an example of an assembly of a panel and self-attaching fastener with a die shown deforming the rim of the fastener outward over the panel.

As depicted in FIGS. 13 and 14, examples of the present disclosure include an assembly 70 that has a fastening element installed in a hard steel panel 50. In examples, the fastening element is a self-attaching fastener 20, 20', 20". As used herein, a hard steel panel 50 is at least as hard as the self-attaching fastener 20, 20', 20". In the present disclosure, the hardness of the fastener refers to the core hardness of the fastener. Hard steel may have, for example a Rockwell B (HRB) hardness of greater than 200. The hardness of steel is related to the ultimate strength of the steel. In examples of the present disclosure, the hard steel panel may be high strength steel with an ultimate strength of 500 MPa or more. In other examples, the ultimate strength of the steel panel may be less than 500 MPa, as long as the panel hardness of the steel panel is at least the same as the core hardness of the self-attaching fastener 20, 20', 20".

As used herein, "panel hardness" is used to distinguish the hardness of the panel from the hardness of the self-attaching fastener. "Panel hardness" does not imply a particular test procedure. In an example, the hard steel panel may be Dual Phase (DP) 780 or higher steel. In other examples, the hard steel panel may be martensitic steel, or Transformation induced plasticity (TRIP) steel. In examples of the present disclosure, the self-attaching fastener 20, 20', 20" may have a core hardness ranging from about HRB 30 to about HRB 95. In other examples, the core hardness may be greater than HRB 95, as long as the hard steel panel 50 is at least as hard as the self-attaching fastener. In examples, the self-attaching fastener may be made from AISI (American Iron and Steel Institute) 1018, 1035, or 4140 steel. In other examples, the self-attaching fastener may be made from any cold formable material. For example, the self-attaching fastener may be made from low to medium carbon steel, stainless steel, Inconel or Titanium.

The fastening industry classifies fasteners by strength. For example, Grade 8 bolts are stronger than Grade 5 bolts; and Grade 5 bolts are stronger than Grade 2 bolts. The strength classification used with metric bolts is called the "Class". Class 12.9 bolts are stronger than Class 10.9 bolts; and Class 10.9 bolts are stronger than Class 8.8 bolts. Examples of self-attaching fastener of the present disclosure may be made in any Grade or Class.

In examples, the the hard steel panel 50 has a panel hardness at least the same as a core hardness of the self-attaching fastener 20. The assembly 70 includes a hard steel panel 50 having an aperture 61 defined therethrough. For example the aperture 61 may be defined by piercing, punching, broaching, machining, laser ablation, or any other suitable method for defining an aperture in a hard steel panel. In examples of the present disclosure, a burr 47 may be defined on an edge 62 of the aperture 61 in the panel 50 on a burr side 63 of the panel 50. In examples, if the aperture 61 is punched or pierced in the panel 50, there may be a burr 47 on the panel as depicted in FIG. 14. In other examples, there may be no burr 47 because the burr 47 was removed or because the burr 47 was never formed.

Figure 17:
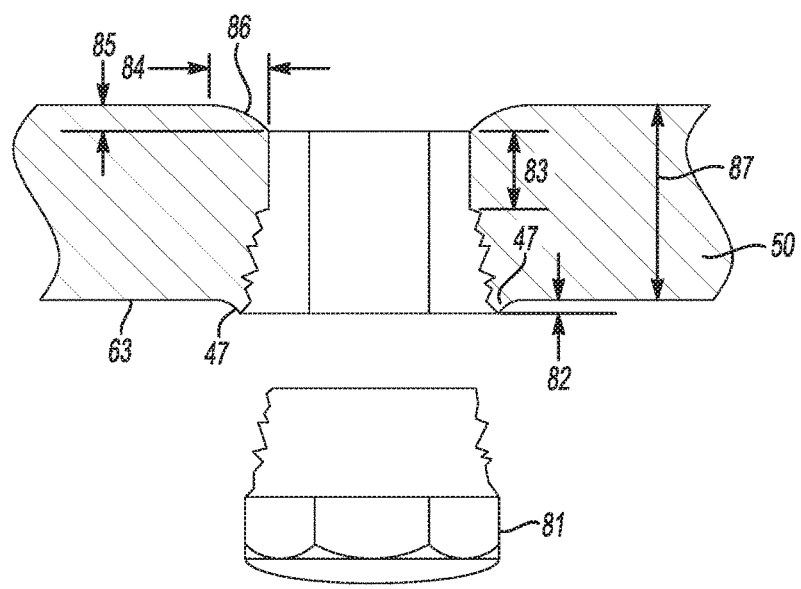
FIG. 17 depicts a schematic cross-sectional view of an aperture punched in a panel.

FIG. 17 is a semi-schematic cross-sectional view of an example of a typical slug punched from a panel. FIG. 17 is included to illustrate nomenclature related to punched apertures in a panel 50. Roughness has been exaggerated for illustrative purposes. The slug 81 is the material that is removed from the panel 50. As shown in FIG. 17, a burr 47 may be formed on the panel 50. The burr side 63 is the side of the panel facing the direction of ejection of the slug 81. A burnished land 83 is characterized by a relatively smooth surface. A rollover 86 may be on the side of the panel where the punch makes contact. The rollover width 84 and rollover depth 85 are measurements of the rollover 86 as shown in FIG. 17. The thickness of the panel 50 is illustrated at reference numeral 87.

Examples of the assembly 70 of the present disclosure include a self-attaching fastener 20, as disclosed herein and described above. The aperture 61 is complementary to the central pilot portion 25. For example, if the central pilot portion 25 is hexagonal, then the aperture 61 is also hexagonal. The aperture 61 is sized to provide clearance from about 0.01 mm to about 0.5 mm to the central pilot portion 25. For example, if the distance between flat sides of the perimetric wall 48 is 10 mm, the distance between flat sides of the aperture 61 would be greater than 10 mm and less than 10.5 mm. The clearance allows the self-attaching fastener 20 to be installed with substantially no insertion force. For example, once the self-attaching fastener 20 is rotationally aligned with the aperture 61, the self-attaching fastener 20 may drop into the aperture 61 under the influence of gravity. If the fastener is inserted from below the panel, the insertion force will be substantially equal to the weight of the self-attaching fastener. If the self-attaching fastener 20 is inserted horizontally, the insertion force will be negligible. In the example depicted in FIG. 14, the groove 44 has clearance to the burr 47 when the self-attaching fastener 20 is inserted into the aperture such that the panel 50 contacts the panel support surface 43 of the head portion 22. In other examples, where there is no burr 47, then the groove 44 may or may not be included as a feature of the present disclosure.

As depicted in FIG. 14, a rim 52 of the central pilot portion 25 (see FIG. 13) is upset outwardly extending over a perimeter 64 of the aperture 61. The upset rim 52' of the central pilot portion 25 retains the self-attaching fastener 20 in the panel against a predetermined pull-out force. The predetermined pull-out force, for example, may be applied via the threaded bore 26 or the threaded shaft 60 along the longitudinal axis 24 in a direction from the central pilot portion 25 toward the head portion 22. As such, the pull-out force may be applied by pushing. In an example, the pull-out force ranges from about 1.1 kN (kilonewtons) to about 9.5 kN, depending on the size of the self-attaching fastener 20 and the thickness of the panel 50.

As stated above, the central pilot portion 25 has a perimetric wall 48, and the perimetric wall 48 has rectangular faces 49' of the pilot polyhedron 31. The rectangular faces 49' engage complementary faces 89 of the panel defining the polygonal panel aperture 61 to resist relative rotation between the self-attaching fastener 20 and the panel 50 when a predetermined torque is applied to the self-attaching fastener 20. In examples where the self-attaching fastener has a hex head, the predetermined torque may be applied at the hex head. The predetermined torque may be about 27 N*m (Newton meters) for an example of an M6 self-attaching nut according to the present disclosure. As the size of the fastener increases, the resistance to relative rotation increases, and the predetermined torque is increased accordingly. For example, the predetermined torque may be about 170 N*m for an example of an M12 self-attaching nut according to the present disclosure. The relative rotation resistance also depends on the thickness of the panel 50. A thick panel can support more torque than a thin panel.

As disclosed herein, the anti-rotation feature of the assembly 70 does not depend on the panel 50 being deformed by being pressed into a fastener. As such, the anti-rotation characteristics of the assembly 70 as disclosed herein are advantageous for panels 50 that are made of steel with a greater hardness than the self-attaching fastener 20, 20', 20". When a panel has a panel hardness that is much higher than the core hardness of a self-piercing fastener, the self-piercing fastener may be unable to pierce the panel. When a panel has a panel hardness that is at least the same as the self-attaching fastener (for example, using the Rockwell B hardness scale) anti-rotation features that are intended to cause deformation of the panel 50 during crimping may instead be deformed by the panel 50 and have their effectiveness as anti-rotation features diminished.

Figure 1:
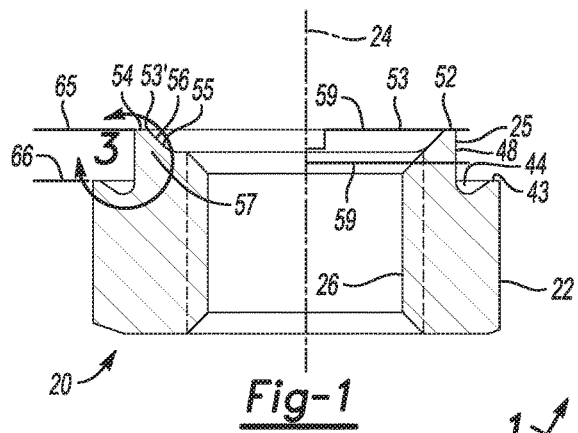
FIG. 1 is a cross-sectional view of an example of a self-attaching fastener of the present disclosure.
Figure 2:
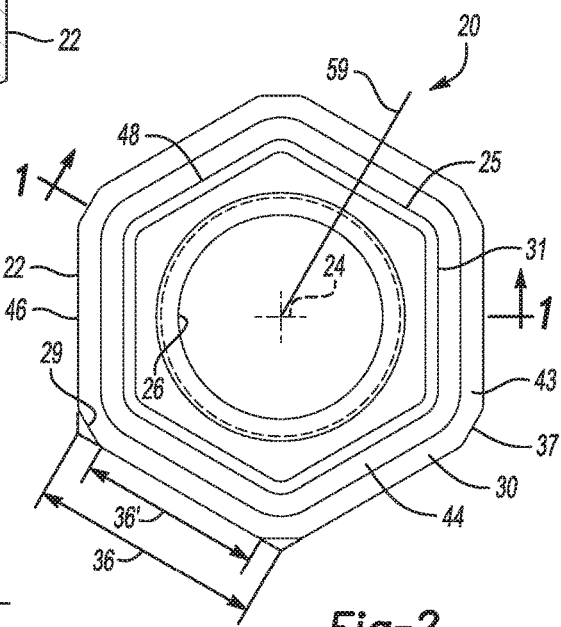
FIG. 2 is an end view of the example of the self-attaching fastener depicted in FIG. 1.
Figure 3:
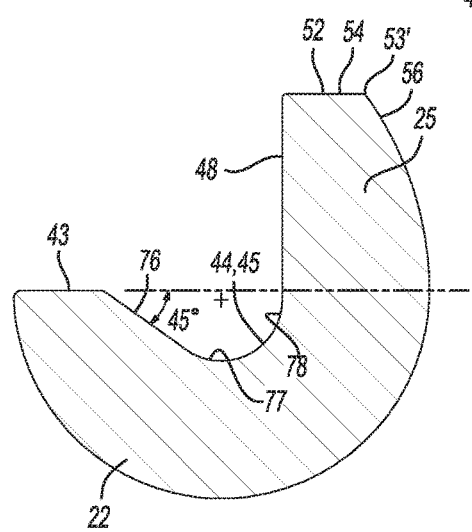
FIG. 3. is a detail cross-sectional view taken from FIG. 1 depicting a groove defined in the panel support surface in the head portion of the example of the self-attaching fastener depicted in FIG. 1.
Figure 4:
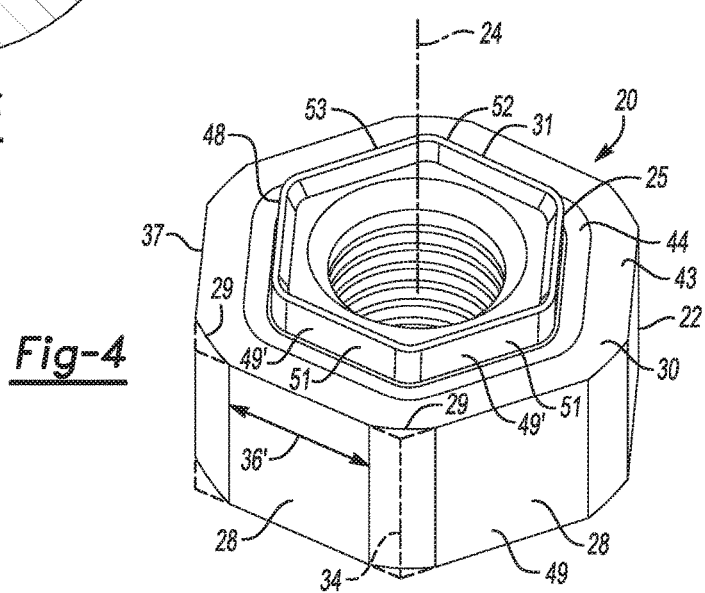
FIG. 4 is a perspective view of the example of the self-attaching fastener depicted in FIG. 1.

In examples of the assembly 70 of the present disclosure, the planar end face 54 of the rim 52 defines a first plane 65 (see FIG. 1). It is to be understood that the planar end face 54 may deviate from being absolutely planar because of manufacturing tolerances in the forming of the self-attaching fastener 20. It is to be understood that about 0.25 mm of waviness in the planar end face 54 does not detract from the serviceability of the self-attaching fastener 20 or the assembly 70.

The planar panel support surface 43 defines a second plane 66 (see FIG. 1). Before the rim 52 of the central pilot portion 25 is upset, the first plane 65 is parallel to the second plane 66, and a distance between the first plane 65 and the second plane 66 is about 0.50 millimeter (mm) to about 0.75 mm greater than a thickness 87 of the panel. In other words, the rim 52 of the central pilot portion 25 is proud of the panel by about 0.50 mm to about 0.75 mm. After the rim 52 of the central pilot portion 25 is upset, less than about 0.50 mm of the rim 52 extends beyond the face 67 of the panel 50 nearest to the rim 52. In other words, after the rim 52 is upset, the rim 52 is proud of the panel 50 by less than 0.50 mm.

Figure 18:
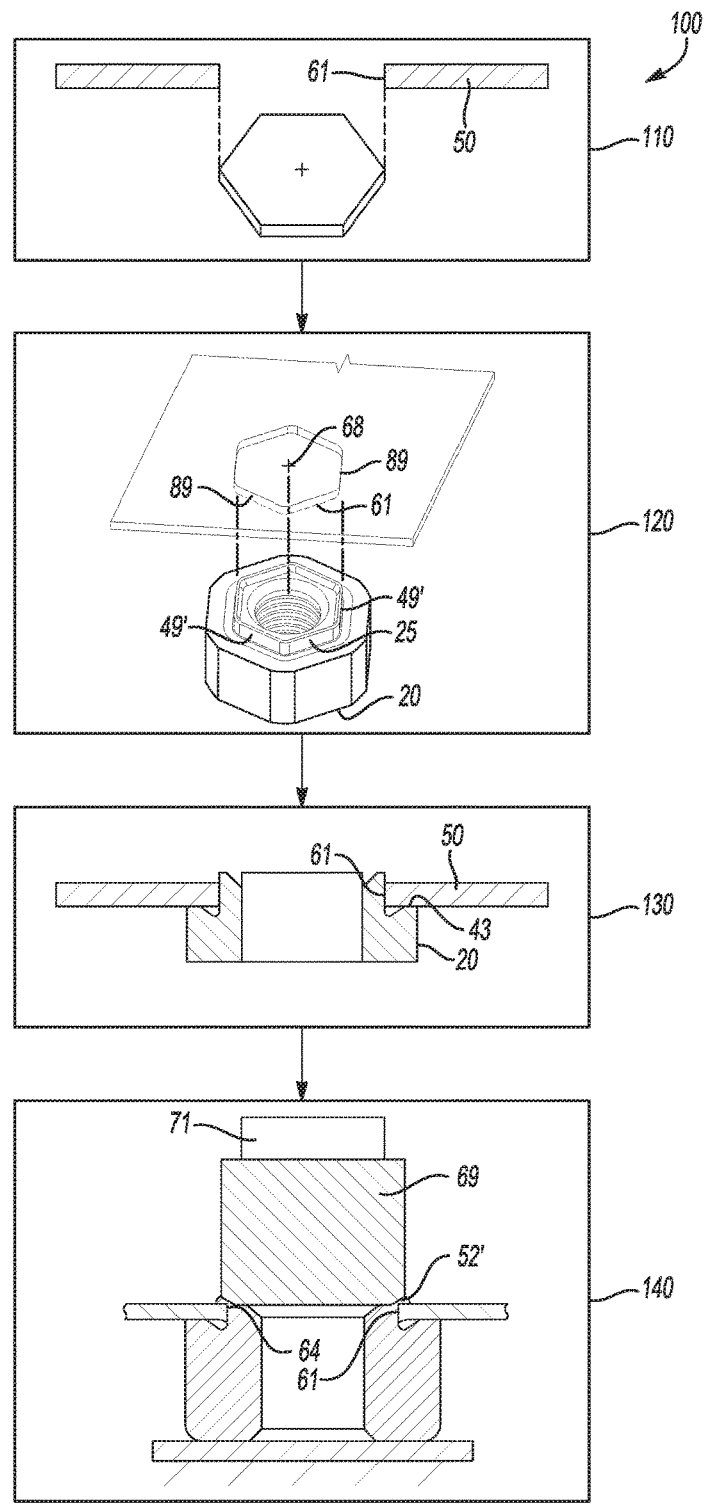
FIG. 18 is a flow chart depicting an example of the method of the present disclosure.

A method 100 of attaching the self-attaching fastener 20 in the panel 50, is also disclosed herein. FIG. 18 is a flow chart depicting and example of the method 100. The method 100 includes forming a substantially polygonal panel aperture 61 in a hard steel panel 50 as depicted at reference numeral 110. After the panel aperture 61 has been formed, as shown at reference numeral 120, the method 100 includes then aligning a central pilot portion 25 of the self-attaching fastener 20 with the aperture 61. It is to be understood that the method 100 of the present disclosure is distinct from methods of installing a self-piercing fastener that use the self-piercing fastener to make, enlarge, or contour a hole in the panel. The self-attaching fastener 20 attached using the method of the present disclosure is described hereinabove. As such, although the self-attaching fastener 20 is linked to the method 100, for brevity, the description of the self-attaching fastener 20 is not repeated here with the method.

The aligning 120 includes centering the central pilot portion 25 over the aperture 61 such that the longitudinal axis 24 intersects a centroid 68 of the aperture 61, and is normal to the panel 50. The aligning 120 further includes rotating the self-attaching fastener 20 such that each of the rectangular faces 49' is parallel to a respective edge 62 of the polygonal panel aperture 61. The rectangular faces 49' are to engage complementary faces 89 of the panel 50 defining the polygonal panel aperture 61 to resist relative rotation between the self-attaching fastener 20 and the panel 50 when a predetermined torque is applied to the self-attaching fastener 20. After the aligning 120, the method 100 includes, as depicted at reference numeral 130, then seating the self-attaching fastener 20 in the panel aperture 61 such that the panel 50 contacts the planar panel support surface 43. After the seating 130, the method 100 includes, as depicted at reference numeral 140, then pressing the rim 52 of the central pilot portion 25 with less than 12 tons of force via a die 69 driven by a press 71, thereby upsetting the rim 52 outwardly to extend over a perimeter 64 of the aperture 61 to retain the self-attaching fastener 20 in the panel 50 against a predetermined pull-out force.

Figure 19:
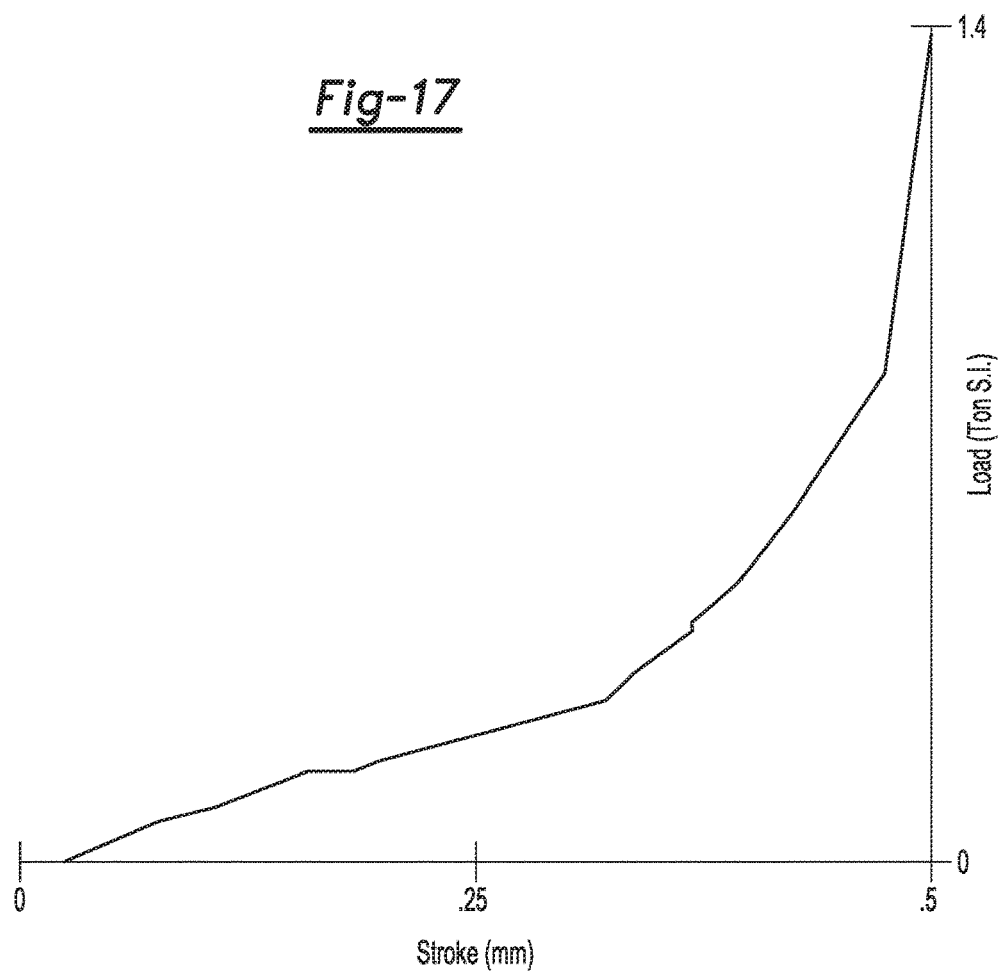
FIG. 19 is a graph depicting an example of a load on a press during crimping of a self-attaching fastener to a panel according to the present disclosure.

FIG. 19 is a graph showing stroke vs. load with regard to an example of a press 71 crimping an example of a self-attaching fastener 20 in a panel 50 according to the present disclosure. As shown in the graph, the self-attaching fastener 20 was mounted to the panel 50 with a peak load on the press 71 of about 1.4 tons and stroke of about 0.45 mm.

Figure 20:
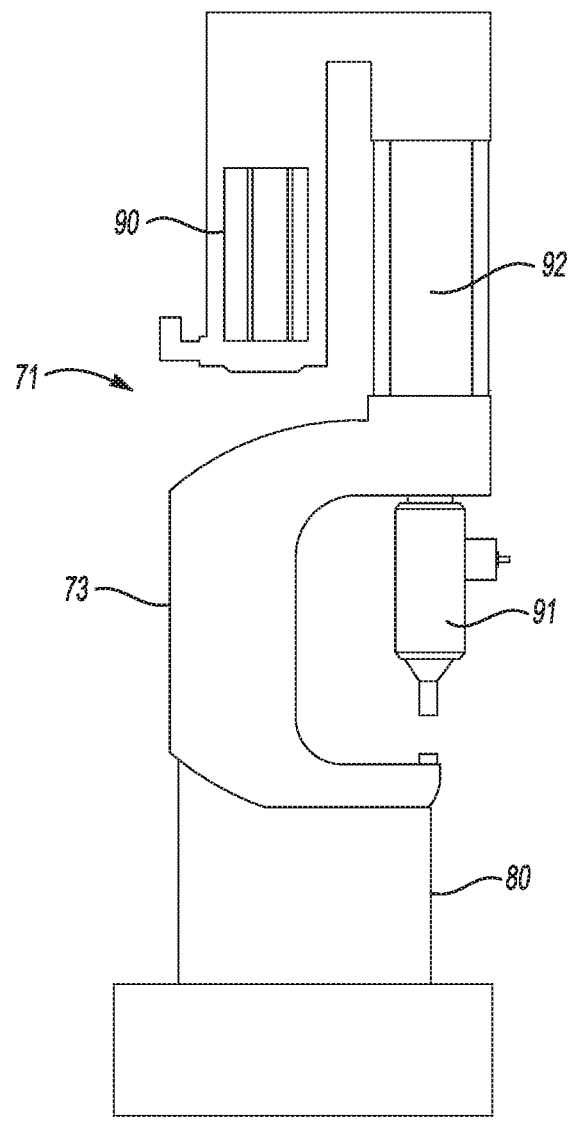
FIG. 20 is a side view of an example of a c-frame press with a stationary pedestal mount.
Figure 21:
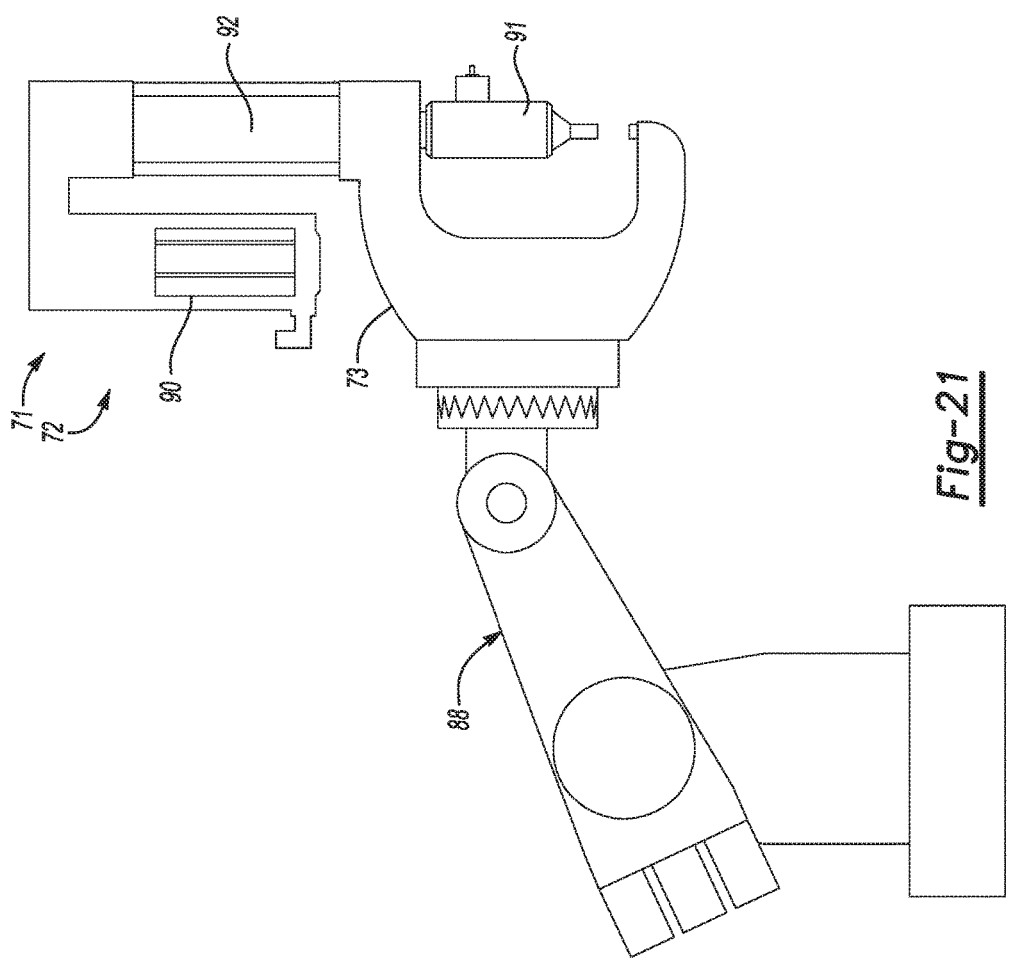
FIG. 21 is a side view of a robotic press.

As disclosed herein, the press 71 may be a robotic press 72, or a c-frame press 73. FIG. 20 is a side view of an example of a c-frame press 73 with a stationary pedestal 80 mount. With the c-frame press 73 mounted on the pedestal 80, the panel 50 may be maneuvered relative to the c-frame press 73. The motor is depicted at reference numeral 90, the spindle is at reference numeral 92 and the installation head is shown at reference numeral 91. FIG. 21 is a side view of a robotic press 72. The robotic press 72 has a c-frame press 73 mounted on a robotic arm 88. The motor is depicted at reference numeral 90, the spindle is at reference numeral 92 and the installation head is shown at reference numeral 91. When the robotic press 72 is used, the c-frame press 73 may be maneuvered with respect to the panel 50. The relatively low press loads required to crimp the self-attaching fastener 20 of the present disclosure advantageously allows the use of a robotic press 72 with a relatively light weight c-frame press 73. A lighter c-frame press 73, allows for a smaller robotic arm 88, faster movement of the robotic press 72 over the panel 50, less capital investment, less energy consumption, less manufacturing space, and lower cost of operation.

The term robotic press 72 as used herein, does not mean a stationary press that is operated automatically; for example a stationary press that has the panel presented by a material handling robot or a stationary press that is tended by a robot. The self-attaching fastener 20 of the present disclosure may be advantageously used with such a stationary press because a relatively small press can handle the crimp loads of the present disclosure. However, the self-attaching fastener 20 of the present disclosure allows the use of a robotic press 72 where a stationary press would have been mandatory because of the large press required to install self-piercing fasteners in high strength steel panels.

The method 100 is advantageous when the hard steel panel 50 has a panel hardness at least the same as a core hardness of the self-attaching fastener 20. In the method 100 the self-attaching fastener 20 is not used to make the aperture 61, and there is clearance between the undeformed central pilot portion and the edges of the aperture 61. As such, the self-attaching fastener 20 is not damaged by installing in the hard steel panel 50, even though the self-attaching fastener is not as hard as the panel 50. The method 100 does not deform the hard steel panel 50 after the aperture 61 has been formed. This is different from other methods where the panel is pressed to extrude under an undercut formed in a fastener. The method 100 of the present disclosure does not cause the panel to bend or extrude to engage anti-rotation or pull-out resistant features of a fastener. The method 100 of the present disclosure includes deforming the rim 52 outwardly to extend over the perimeter 64 of the aperture 61 to retain the self-attaching fastener 20 in the panel 50 against a predetermined pull-out force.

In examples, the die 69 driven by the press 71 in the method 100 presents a flat face 74 normal to the longitudinal axis 24 for contact with rim 52 of the central pilot portion. It is believed that the interior chamfer 56 of the rim 52 biases the collapse of the rim 52 in an outward direction, even if the die 69 is not angled to urge the material of the rim 52 to flow outwardly. In the example depicted in FIG. 14, the die 69 includes a flat face 74 surrounded by a chamfered edge 75. The chamfered edge 75 provides an outlet for the extruding material of the rim 52 and may protect against capturing the material in the die 69 and preventing flow of the extrudate.

It is to be understood that disclosure of any ranges herein is for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a pull-out force range from about 1.1 kN to about 9.5 kN should be interpreted to include not only the explicitly recited limits of 1.1 kN to 9.5 kN, but also to include individual pull-out forces such as 2.0 kN, 4.5 kN, etc., and sub-ranges such as from about 3.0 kN to about 7.9 kN, etc. Furthermore, when "about" or "approximately" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A self-attaching fastener, comprising:
    a substantially polyhedral head portion defining a longitudinal axis wherein the head portion is circumscribable by a first cylinder having a head diameter wherein the first cylinder is coaxial to the longitudinal axis;
    a central pilot portion substantially defining a pilot polyhedron extending from the head portion along the longitudinal axis wherein:
        the central pilot portion is circumscribable by a second cylinder having a pilot diameter smaller than the head diameter;
        the second cylinder is coaxial to the longitudinal axis;
        the central pilot portion has a perimetric wall;
        the perimetric wall has rectangular faces of the pilot polyhedron; and
        the rectangular faces are defined in respective planes that are parallel to the longitudinal axis; and
    a planar panel support surface defined on the head portion, wherein the planar panel support surface defines a closed substantially polygonal planar margin at a perimeter of the planar panel support surface; and
    a groove defined parallel and adjacent to the panel support surface in the bead portion, wherein the groove defines a closed substantially polygonal trough between the panel support surface and the central pilot portion.

2. The self-attaching fastener as defined in claim 1 wherein:
    a rim is defined at a leading end of the perimetric wall;
    the rim has a planar end face at a leading end of the rim corresponding to the leading end of the perimetric wall;
    the rim has an inner wall opposite to the perimetric wall;
    the inner wall defines an interior chamfer such that the leading end of the rim is narrower than a base of the rim at an interface of the rim with a body of the central pilot portion; and
    the body of the central pilot portion is at least twice as thick as the end face of the rim measured along respective lines orthogonal to the longitudinal axis.

3. The self-attaching fastener as defined in claim 1 wherein the self-attaching fastener is a nut having a threaded bore defined along the longitudinal axis continuously through the central pilot portion and the head portion.

4. The self-attaching fastener as defined in claim 1 wherein the self-attaching fastener is a stud having a threaded shaft defined along the longitudinal axis extending from a body of the central pilot portion.

5. The self-attaching fastener as defined in claim 1 wherein the self-attaching fastener is a stud having a threaded shaft defined along the longitudinal axis extending from the head portion.

6. The self-attaching fastener as defined in claim 1 wherein:
    the substantially polyhedral head portion is substantially a regular hexagonal prism; and
    the pilot polyhedron is substantially an other regular hexagonal prism.

7. The self-attaching fastener as defined in claim 6 wherein each rectangular face of the regular hexagonal prism is parallel to a corresponding rectangular face of the other regular hexagonal prism.

8. The self-attaching fastener as defined in claim 1 wherein:
    the substantially polyhedral head portion is substantially a regular hexagonal prism chamfered at longitudinal edges of the regular hexagonal prism; and
    the pilot polyhedron is substantially an other regular hexagonal prism chamfered at longitudinal edges of the other regular hexagonal prism.

9. The self-attaching fastener as defined in claim 1 wherein:
    the substantially polyhedral head portion is substantially a regular hexagonal prism with fillets at longitudinal edges of the regular hexagonal prism; and
    the pilot polyhedron is substantially an other regular hexagonal prism with fillets at longitudinal edges of the other regular hexagonal prism.

10. A fastening element and panel assembly, comprising:
    a hard steel panel having an aperture defined therethrough; and
    a self-attaching fastener, including:
        a substantially polyhedral head portion defining a longitudinal axis wherein the head portion is circumscribable by a first cylinder having a head diameter wherein the first cylinder is coaxial to the longitudinal axis;
        a central pilot portion substantially defining a pilot polyhedron extending from the head portion along the longitudinal axis wherein:

the central pilot portion is circumscribable by a second cylinder having a pilot diameter smaller than the head diameter;
the second cylinder is coaxial to the longitudinal axis;
the central pilot portion has a perimetric wall;
the perimetric wall has rectangular faces of the pilot polyhedron;
the rectangular faces are defined in respective planes that are parallel to the longitudinal axis; and
the rectangular faces engage complementary faces of the panel defining the polygonal panel aperture to resist relative rotation between the self-attaching fastener and the panel when a predetermined torque is applied to the self-attaching fastener; and,
a planar panel support surface defined on the head portion, wherein the planar panel support surface defines a closed substantially polygonal planar margin at a perimeter of the planar panel support surface;
wherein:
the aperture is complementary to the central pilot portion;
a rim of the central pilot portion is upset outwardly extending over a perimeter of the aperture; and
the upset rim of the central pilot portion retains the self-attaching fastener in the panel against a predetermined pull-out force.

11. The assembly as defined in claim 10, further comprising:
a burr defined on an edge of the aperture in the panel on a burr side of the panel; and
a groove defined parallel and adjacent to the panel support surface in the head portion, wherein:
the groove defines a closed substantially polygonal trough between the panel support surface and the central pilot portion; and
the groove has clearance to the burr when the self-attaching fastener is inserted into the aperture such that the panel contacts the panel support surface of the head portion.

12. The assembly as defined in claim 10 wherein:
the rim is defined at a leading end of the perimetric wall;
the rim has a planar end face at a leading end of the rim corresponding to the leading end of the perimetric wall;
the rim has an inner wall opposite to the perimetric wall;
the inner wall defines a chamfer such that a leading end of the rim is narrower than a base of the rim at an interface of the rim with a body of the central pilot portion; and
the body of the central pilot portion is at least twice as thick as the end face of the rim measured along respective lines orthogonal to the longitudinal axis.

13. The assembly as defined in claim 10 wherein the hard steel panel has a panel hardness at least the same as a core hardness of the self-attaching fastener.

14. The assembly as defined in claim 10 wherein the self-attaching fastener is a nut having a threaded bore defined along the longitudinal axis continuously through the central pilot portion and the head portion.

15. The assembly as defined in claim 10 wherein the self-attaching fastener is a stud having a threaded shaft defined along the longitudinal axis extending from a body of the central pilot portion.

16. The assembly as defined in claim 10 wherein the self-attaching fastener is a stud having a threaded shaft defined along the longitudinal axis extending from the head portion.

17. The assembly as defined in claim 10 wherein:
the planar end face of the rim defines a first plane;
the planar panel support surface defines a second plane;
before the rim of the central pilot portion is upset in a first unattached state, the first plane is parallel to the second plane, and a distance between the first plane and the second plane is about 0.50 millimeter (mm) to about 0.75 mm greater than a thickness of the panel; and
after the rim of the central pilot portion is upset in a second attached state, less than about 0.50 mm of the rim extends beyond the face of the panel nearest to the rim.

18. A method of attaching a self-attaching fastener in a panel, comprising:
forming a substantially polygonal panel aperture in a hard steel panel;
then aligning a central pilot portion of the self-attaching fastener with the aperture, wherein the self-attaching fastener includes:
a substantially polyhedral head portion defining a longitudinal axis wherein the head portion is circumscribable by a first cylinder having a head diameter wherein the first cylinder is coaxial to the longitudinal axis;
the central pilot portion substantially defining a pilot polyhedron extending from the head portion along the longitudinal axis, wherein:
the central pilot portion is circumscribable by a second cylinder having a pilot diameter smaller than the head diameter;
the second cylinder is coaxial to the longitudinal axis;
the central pilot portion has a perimetric wall;
the perimetric wall has rectangular faces of the pilot polyhedron;
the rectangular faces are defined in respective planes that are parallel to the longitudinal axis;
the aligning includes:
centering the central pilot portion over the aperture such that the longitudinal axis intersects a centroid of the aperture, and is normal to the panel; and
rotating the self-attaching fastener such that each of the rectangular faces is parallel to a respective edge of the polygonal panel aperture; and
the rectangular faces are to engage complementary faces of the panel defining the polygonal panel aperture to resist relative rotation between the self-attaching fastener and the panel when a predetermined torque is applied to the self-attaching fastener,
wherein:
a rim is defined at a leading end of the perimetric wall;
the rim has a planar end face at a leading end of the rim corresponding to the leading end of the perimetric wall;
the rim has an inner wall opposite to the perimetric wall;
the inner wall defines a chamfer such that a leading end of the rim is narrower than a base of the rim at an interface of the rim with a body of the central pilot portion; and,
the body of the central pilot portion is at least twice as thick as the end face of the rim measured along respective lines orthogonal to the longitudinal axis; and
a planar panel support surface defined on the head portion, wherein the planar panel support surface defines a closed substantially polygonal planar margin at a perimeter of the planar panel support surface;

then seating the self-attaching fastener in the panel aperture such that the panel contacts the planar panel support surface; and then pressing the rim of the central pilot portion with less than 12 tons of force via a die driven by a press, thereby upsetting the rim outwardly to extend over a perimeter of the aperture to retain the self-attaching fastener in the panel against a predetermined pull-out force.

19. The method as defined in claim 18 wherein:

a groove is defined parallel and adjacent to the panel support surface in the head portion; and the groove defines a closed substantially polygonal trough between the panel support surface and the central pilot portion.

20. The method as defined in claim 18 wherein the press is a robotic press, or a c-frame press.

21. The method as defined in claim 18 wherein the hard steel panel has a panel hardness at least the same as a core hardness of the self-attaching fastener.

22. The method as defined in claim 18 wherein the die driven by the press presents a flat face normal to the longitudinal axis for contact with rim of the central pilot portion.

23. A self-attaching fastener, comprising:

a substantially polyhedral head portion defining a longitudinal axis; having a head diameter wherein the first cylinder is coaxial to the longitudinal axis;

a central pilot portion substantially defining a pilot polyhedron extending from the head portion along the longitudinal axis, wherein:

the central pilot portion is circumscribable by a second cylinder having a pilot diameter smaller than the head diameter;

the second cylinder is coaxial to the longitudinal axis;

the central pilot portion has a perimetric wall;

the perimetric wall has rectangular faces of the pilot polyhedron; and the rectangular faces are defined in respective planes that are parallel to the longitudinal axis;

a planar panel support surface defined on the head portion, wherein the planar panel support surface defines a closed substantially polygonal planar margin at a perimeter of the planar panel support surface; and, a rim defined at a leading end of the perimetric wall and having an inner wall opposite to the perimetric wall;

wherein the inner wall defines an interior chamfer such that the leading end of the rim is narrower than a base of the rim at an interface of the rim with a body of the central pilot portion.

24. A self-attaching fastener, comprising:

a substantially polyhedral head portion defining a longitudinal axis; having a head diameter wherein the first cylinder is coaxial to the longitudinal axis;

a central pilot portion substantially defining a pilot polyhedron extending from the head portion along the longitudinal axis wherein:

the central pilot portion is circumscribable by a second cylinder having a pilot diameter smaller than the head diameter;

the second cylinder is coaxial to the longitudinal axis;

the central pilot portion has a perimetric wall;

the perimetric wall has rectangular faces of the pilot polyhedron; and the rectangular faces are defined in respective planes that are parallel to the longitudinal axis; and, a planar panel support surface defined on the head portion, wherein the planar panel support surface defines a closed substantially polygonal planar margin at a perimeter of the planar panel support surface;

wherein the substantially polyhedral head portion is substantially a regular hexagonal prism chamfered at longitudinal edges of the regular hexagonal prism; and the pilot polyhedron is substantially an other regular hexagonal prism chamfered at longitudinal edges of the other regular hexagonal prism.

25. A self-attaching fastener, comprising:

a substantially polyhedral head portion defining a longitudinal axis; having a head diameter wherein the first cylinder is coaxial to the longitudinal axis;

a central pilot portion substantially defining a pilot polyhedron extending from the head portion along the longitudinal axis wherein:

the central pilot portion is circumscribable by a second cylinder having a pilot diameter smaller than the head diameter;

the second cylinder is coaxial to the longitudinal axis;

the central pilot portion has a perimetric wall;

the perimetric wall has rectangular faces of the pilot polyhedron; and the rectangular faces are defined in respective planes that are parallel to the longitudinal axis; and, a planar panel support surface defined on the head portion, wherein the planar panel support surface defines a closed substantially polygonal planar margin at a perimeter of the planar panel support surface;

wherein the substantially polyhedral head portion is substantially a regular hexagonal prism with fillets at longitudinal edges of the regular hexagonal prism; and the pilot polyhedron is substantially an other regular hexagonal prism with fillets at longitudinal edges of the other regular hexagonal prism.

* * * * *